(12) United States Patent
Kawamura (10) Patent No.: US 10,475,181 B2
(45) Date of Patent: Nov. 12, 2019

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Takahiro Kawamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 222 days.

(21) Appl. No.: 15/659,623

(22) Filed: Jul. 26, 2017

(65) Prior Publication Data

US 2018/0068442 A1 Mar. 8, 2018

(30) Foreign Application Priority Data

Sep. 8, 2016 (JP) .................................. 2016-175455

(51) Int. Cl.
*G06T 7/00* (2017.01)
*G06T 5/50* (2006.01)

(52) U.S. Cl.
CPC .............. *G06T 7/0012* (2013.01); *G06T 5/50* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 2009/0324135 A1* | 12/2009 | Kondo .................. | G06T 3/4038 382/284 |
| 2011/0235888 A1* | 9/2011 | Takahashi ............ | A61B 6/5205 382/132 |
| 2011/0305405 A1* | 12/2011 | Kawamura ........... | G06T 3/0068 382/294 |
| 2013/0342577 A1* | 12/2013 | Wang ...................... | G06T 11/60 345/634 |
| 2015/0297159 A1* | 10/2015 | Melman .................. | G21K 1/04 378/62 |
| 2016/0166221 A1* | 6/2016 | Gao ........................ | A61B 6/032 378/5 |
| 2017/0065244 A1* | 3/2017 | Taki ...................... | A61B 6/4291 |
| 2018/0085081 A1* | 3/2018 | Tanaka .................... | G21K 1/10 |

FOREIGN PATENT DOCUMENTS

JP H03-285475 12/1991

* cited by examiner

*Primary Examiner* — Vikkram Bali
(74) *Attorney, Agent, or Firm* — JCIPRNET (57) ABSTRACT

An image acquisition unit acquires first and second radiation images from first and second radiation detectors. A first frequency analysis unit generates a first high-frequency component and a first low-frequency component of the first radiation image, and a second frequency analysis unit generates a second low-frequency component of the second radiation image. A subtraction processing unit generates a subtraction low-frequency component from the first low-frequency component and the second low-frequency component, and a synthesis unit synthesizes the subtraction low-frequency component and the first high-frequency component to generate a processed image.

5 Claims, 6 Drawing Sheets

IMAGE PROCESSING APPARATUS, IMAGE PROCESSING METHOD, AND IMAGE PROCESSING PROGRAM

CROSS REFERENCE TO RELATED APPLICATIONS

The present application claims priority under 35 U.S.C. § 119 to Japanese Patent Application No. 2016-175455 filed on Sep. 8, 2016. The above application is hereby expressly incorporated by reference, in its entirety, into the present application.

BACKGROUND

Field of the Invention

The present invention relates to an image processing apparatus, an image processing method, and an image processing program for performing weighting and subtraction with respect to two radiation images to generate a subtraction image obtained by extracting a specific structure of a subject.

Related Art

In the related art, an energy subtraction process that uses two radiation images obtained by irradiating a subject with radiation rays having two different kinds of energy distributions using the fact that the amount of attenuation of transmitted radiation varies according to a material that forms the subject is known. The energy subtraction process refers to a method for matching pixels of two radiation images obtained in this way with each other, performing subtraction between the pixels in a state where appropriate weighting coefficients are multiplied, and acquiring an image obtained by extracting a specific structure. For example, in a case where a soft portion image in which a bone portion is removed from a radiation image obtained by imaging a chest portion is generated by performing such an energy subtraction process, it is possible to observe shading in a soft portion without interference of the bone portion. Contrarily, in a case where a bone portion image from which a soft portion is removed is generated, it is possible to observe shading in a bone portion without interference of the soft portion.

In order to perform such an energy subtraction process, a subject may be imaged so that energy distributions of radiation rays in a case where two radiation images are acquired become different from each other. As an imaging method (hereinafter, referred to as energy subtraction imaging) for performing such an energy subtraction process, a one-shot method and a two-shot method are known. The one-shot method is a method in which two detection means for detecting radiation to acquire radiation images are disposed in an overlapping manner and the two detection means which are disposed in an overlapping manner are simultaneously irradiated with radiation that passes through a subject so that the two detection means are irradiated with radiation rays having different energy distributions. The two-shot method is a method in which imaging is performed two times using two different kinds of radiation rays having different energy distributions.

In the subtraction image acquired by such an energy subtraction process, compared with a radiation image before processing, quantum noise (hereinafter, referred to as noise) of radiation is emphasized, and thus, the S/N ratio becomes poor. Thus, a technique for reducing a noise component from a subtraction image has been proposed. For example, JP1991-285475A (JP-H03-285475A) has proposed a technique for generating a subtraction image from two radiation images acquired by energy subtraction imaging and an addition image obtained by adding the two radiation images, smoothening the subtraction image to reduce a noise component, and performing a subtraction process between the smoothened subtraction image and the addition image.

SUMMARY

The one-shot method is a method for alternately irradiating two detection means with radiation rays having different energy distributions using a phenomenon in which a low energy component is absorbed in a case where radiation passes through a substance and radiation having a relatively large high energy component is transferred to a rear stage, that is, using beam hardening. On the other hand, in imaging of a portion including a portion having a large body thickness, for example, in imaging of a lumbar spine, in imaging of a hip joint shaft portion, or in imaging of a cervical spine side surface including the shoulder, a large amount of low energy component is absorbed by a subject. Thus, in radiation immediately after passing through the subject, a high energy component becomes large. Thus, a difference in beam hardening between two detection means disposed in an overlapping manner does not become severe, and an energy difference between emitted radiation rays becomes small. Thus, the S/N ratio deteriorates in a difference image. Accordingly, the energy subtraction process based on the one-shot method is mainly applied to imaging of the chest portion having a relatively small body thickness, and is not suitable for being applied to a portion having a large body thickness.

On the other hand, in order to perform such an energy subtraction process with respect to a portion having a large body thickness, it may be considered that the two-shot method is applied. However, in the two-shot method, in order to reduce an exposure dose to a subject, in the second imaging, the amount of radiation emitted to the subject is reduced compared with the first imaging. As a result, a radiation image acquired by the second imaging has a large amount of noise due to a shortage of the amount of radiation.

In consideration of the above problems, an object of the invention is to provide an image processing apparatus, an image processing method, and an image processing program for performing an energy subtraction process, capable of reducing an exposure dose to a subject and generating a subtraction image with a small amount of noise even with respect to a portion having a large body thickness.

According to an aspect of the invention, there is provided an image processing apparatus comprising: image acquisition unit for acquiring two radiation images obtained by radiation rays passed through a subject, having different energy distributions and different amounts of radiation; first frequency analysis unit for generating a first high-frequency component and a first low-frequency component which are a high-frequency component and a low-frequency component of a first radiation image acquired by radiation having a large amount of radiation among the two radiation images; second frequency analysis unit for generating a second low-frequency component which is a low-frequency component of a second radiation image acquired by radiation having a small amount of radiation among the two radiation images; subtraction unit for performing weighting and subtraction between corresponding pixels with respect to the first low-frequency component and the second low-frequency component to generate a subtraction low-frequency component obtained by extracting a specific structure of the subject; and synthesis unit for synthesizing the subtraction low-frequency component and the first high-frequency component to generate a processed image.

In the case of a one-shot method, radiation passed through a subject is emitted to two detection unit which are disposed in an overlapping manner. Thus, detection unit on a side more distant from a radiation source has a small amount of emitted radiation compared with detection unit on a side closer to the radiation source. Further, radiation having a relatively large high energy component is emitted to the detection unit on the side more distant from the radiation source compared with that of the detection unit on the side closer to the radiation source. Accordingly, in the one-shot method, between a radiation image obtained by the detection unit on the side closer to the radiation source and a radiation image obtained by the detection unit on the side more distant from the radiation source, energies and the amounts of radiation are different from each other. On the other hand, in the case of a two-shot method, by using radiation having a relatively large high energy component and a small amount of radiation in one imaging compared with the other imaging, it is possible to set energies and the amounts of radiation emitted from the radiation source to be different from each other between the first imaging and the second imaging. Thus, between a radiation image obtained by the first imaging and a radiation image obtained by the second imaging, energies and the amounts of radiation are different from each other. Accordingly, in the invention, two radiation images may be obtained by either of the one-shot method or the two-shot method.

In the image processing apparatus according to this aspect of the invention, the synthesis unit may perform weighting and synthesis with respect to the subtraction low-frequency component and the first high-frequency component according to a body thickness of the subject to generate the processed image.

In the image processing apparatus according to this aspect of the invention, the synthesis unit may perform weighting and synthesis with respect to the subtraction low-frequency component and the first high-frequency component according to a density of the first radiation image or the second radiation image to generate the processed image.

In the image processing apparatus according to this aspect of the invention, the first frequency analysis unit may generate the first high-frequency component and the first low-frequency component having frequency bands according to imaging portions of the subject, and the second frequency analysis unit may generate the second low-frequency component having a frequency band according to an imaging portion of the subject.

According to another aspect of the invention, there is provided an image processing method comprising: acquiring two radiation images obtained by radiation rays passed through a subject, having different energy distributions and different amounts of radiation; generating a first high-frequency component and a first low-frequency component which are a high-frequency component and a low-frequency component of a first radiation image acquired by radiation having a large amount of radiation among the two radiation images; generating a second low-frequency component which is a low-frequency component of a second radiation image acquired by radiation having a small amount of radiation among the two radiation images; performing weighting and subtraction between corresponding pixels with respect to the first low-frequency component and the second low-frequency component to generate a subtraction low-frequency component obtained by extracting a specific structure of the subject; and synthesizing the subtraction low-frequency component and the first high-frequency component to generate a processed image.

According to still another aspect of the invention, a program for causing a computer to execute the image processing method according to the above-described aspect of the invention may be provided.

According to the invention, a first high-frequency component and a first low-frequency component of a first radiation image acquired by radiation having a large amount of radiation among two radiation images are generated, and a second low-frequency component of a second radiation image acquired by radiation having a small amount of radiation is generated. Further, weighting and subtraction between corresponding pixels are performed with respect to the first low-frequency component and the second low-frequency component to generate a subtraction low-frequency component, and the subtraction low-frequency component and the first high-frequency component are synthesized to generate a processed image.

Here, since the first radiation image is acquired by radiation with a large amount of radiation, noise is small. Thus, the first high-frequency component which is a high-frequency component of the first radiation image has noise which is not noticeable, and includes information on a fine structure of a subject. Further, the first low-frequency component which is a low-frequency component of the first radiation image includes information on a general structure of the subject. On the other hand, since the second radiation image is acquired by X-rays with a small amount of radiation, granulation is poor, and thus, a large amount of noise is included therein. However, since noise represents information on a high-frequency component, the second low-frequency component which is a low-frequency component of the second radiation image includes information on a general structure of the subject, which does not include noise. Thus, each item of information on general structures of the subject with different energy distributions is included in the first low-frequency component and the second frequency component. Accordingly, the subtraction low-frequency component includes information on the general structure of the specific structure of the subject that does not include noise. Further, by synthesizing the subtraction low-frequency component and the first high-frequency component, even in a portion having a large body thickness, it is possible to generate a processed image obtained by extracting a specific structure of the subject, having a fine structure of the subject and reduced noise. Further, although the amount of radiation is low in a case where the second radiation image is acquired using a two-shot method, it is possible to reduce noise of a processed image, and thus, it is possible to reduce an exposure dose of the subject.

DETAILED DESCRIPTION

Figure 1:
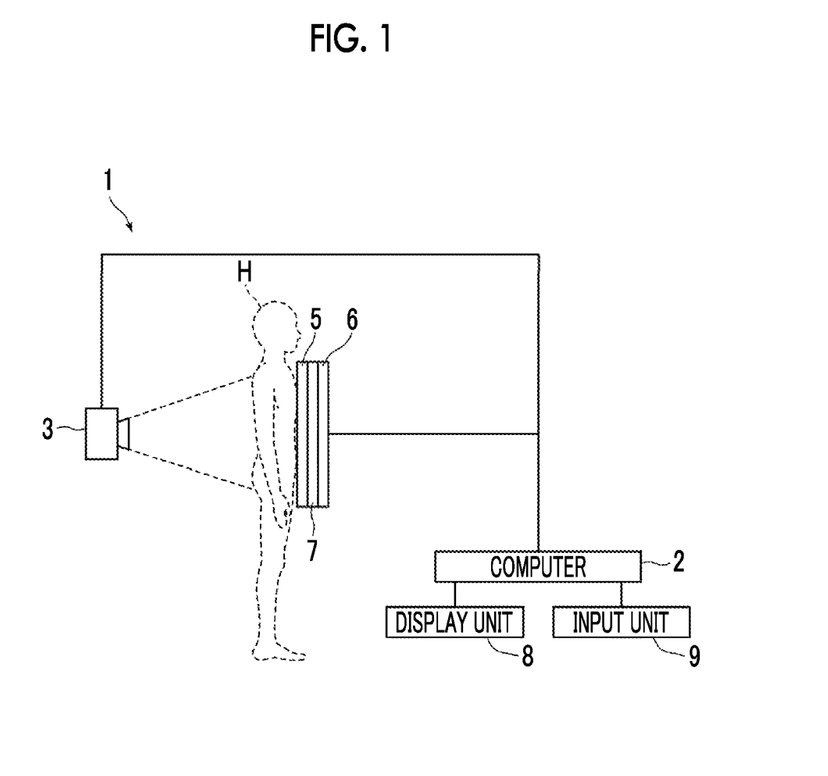
FIG. 1 is a block diagram showing a schematic configuration of a radiation imaging system to which an image processing apparatus according to a first embodiment of the invention is applied.

Hereinafter, embodiments of the invention will be described with reference to the accompanying drawings. FIG. 1 is a block diagram showing a schematic configuration of a radiation imaging system to which an image processing apparatus according to a first embodiment of the invention is applied. As shown in FIG. 1, the radiation imaging system according to the embodiment captures two radiation images having different energy distributions, and performs an energy subtraction process using the two radiation images. The radiation imaging system includes an imaging apparatus 1, and a computer 2 that includes the image processing apparatus according to this embodiment.

The imaging apparatus 1 is an imaging apparatus for performing so-called one shot energy subtraction for converting energy of X-rays emitted from an X-ray source 3 which is a radiation source and passed through a subject H and irradiating a first radiation detector 5 and a second radiation detector 6 with the energy-converted X-rays. In imaging, as shown in FIG. 1, the first radiation detector 5, an X-ray energy converting filter 7 formed of a copper plate or the like, and the second radiation detector 6 are disposed sequentially from a side closer to the X-ray source 3, and then, the X-ray source 3 is driven. The first and second radiation detectors 5 and 6, and the X-ray energy converting filter 7 are brought into close contact with each other.

Thus, in the first radiation detector 5, a first radiation image G1 of the subject H based on X-rays of low energy including so-called soft rays is acquired. Further, in the second radiation detector 6, a second radiation image G2 of the subject H based on X-rays of high energy from which the soft rays are removed is acquired. The first and second radiation images are input to the computer 2 which is an image processing apparatus. Since the first radiation detector 5 among the first radiation detector 5 and the second radiation detector 6 is disposed on the side closer to the X-ray source 3, the first radiation image G1 is acquired by X-rays with a large amount of radiation compared with the second radiation image G2.

The first and second radiation detectors 5 and 6 are able to repeat recording and reading of radiation images. The first and second radiation detectors 5 and 6 may be a so-called direct type radiation detector that directly receives emission of radiation to generate electric charges, or may be a so-called indirect type radiation detector that converts visible light into an electric charge signal. Further, it is preferable that a reading method of a radiation image signal is a so-called thin film transistor (TFT) reading method for switching on and off a TFT switch to read a radiation image signal, or may be a so-called optical reading method for reading a radiation image signal with irradiation of reading light, but the reading method is not limited thereto and may be other methods.

A display unit 8 and an input unit 9 are connected to the computer 2. The display unit 8 includes a cathode ray tube (CRT), a liquid crystal display, or the like, and performs assistance of a radiation image acquired through imaging and a variety of inputs necessary for processes performed in the computer 2. The input unit 9 includes a keyboard, a mouse, a touch panel, or the like.

An image processing program of this embodiment is installed in the computer 2. In this embodiment, the computer 2 may be a work station or a personal computer that is directly operated by an operator, or may be a server computer that is connected thereto through a network. The image processing program may be recorded on a recording medium such as a digital versatile disc (DVD) or a compact disc read only memory (CD-ROM) for distribution, and may be installed into the computer from the recording medium. Alternatively, the image processing program may be stored in a storage device of a server computer connected to a network or a network storage in an accessible state from the outside, and may be downloaded into the computer as necessary for installation.

Figure 2:
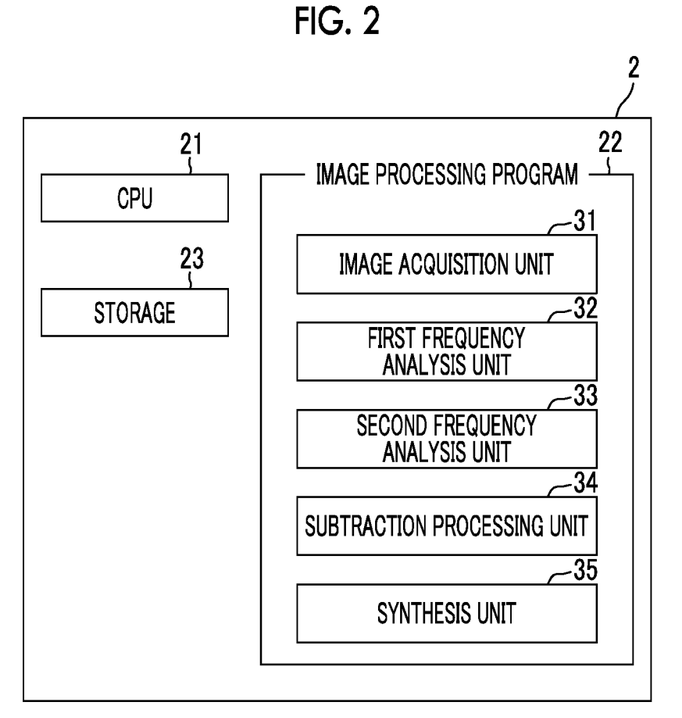
FIG. 2 is a diagram showing a schematic configuration of the image processing apparatus according to the embodiment.

FIG. 2 is a diagram showing a schematic configuration of an image processing apparatus realized by installing an image processing program in the computer 2 in this embodiment. As shown in FIG. 2, the image processing apparatus includes a central processing unit (CPU) 21, a memory 22, and a storage 23 as components of a standard computer.

The storage 23 includes a storage device such as a hard disk or a solid state drive (SSD), and stores a variety of information including a program and an image processing program for driving respective units of the imaging apparatus 1. The storage 23 also stores a radiation image acquired through imaging.

A program or the like stored in the storage 23 is temporarily stored in the memory 22 in order to cause the CPU 21 to execute various processes. The image processing program defines, as processes to be executed by the CPU 21, an image acquisition process of causing the imaging apparatus 1 to perform imaging to acquire the first and second radiation images G1 and G2, a first frequency analysis process of generating a first high-frequency component GH1 and a first low-frequency component GL1 which are a high-frequency component and a low-frequency component of the first radiation image G1 acquired by the first radiation detector 5 which is disposed on the side closer to the X-ray source 3, that is, acquired by X-rays having a large amount of radiation, a second frequency analysis process of generating a second low-frequency component GL2 which is a low-frequency component of the second radiation image G2 acquired by the second radiation detector 6 which is disposed on the side more distant from the X-ray source 3, that is, acquired by X-rays having a small amount of radiation, a subtraction process of performing weighting and subtraction between corresponding pixels with respect to the first low-frequency component GL1 and the second low-frequency component GL2 to generate a subtraction low-frequency component GLsub obtained by extracting a specific structure of the subject H, and a synthesis process of synthesizing the subtraction low-frequency component GLsub and the first high-frequency component GH1 to generate a processed image Gs.

Further, as the CPU 21 executes these processes according to the image processing program, the computer 2 functions as an image acquisition unit 31, a first frequency analysis unit 32, a second frequency analysis unit 33, a subtraction processing unit 34, and a synthesis unit 35. The computer 2 may include a processor or a processing circuit that performs the first frequency analysis process, the second frequency analysis process, the subtraction process, and the synthesis process, respectively.

Figure 3:
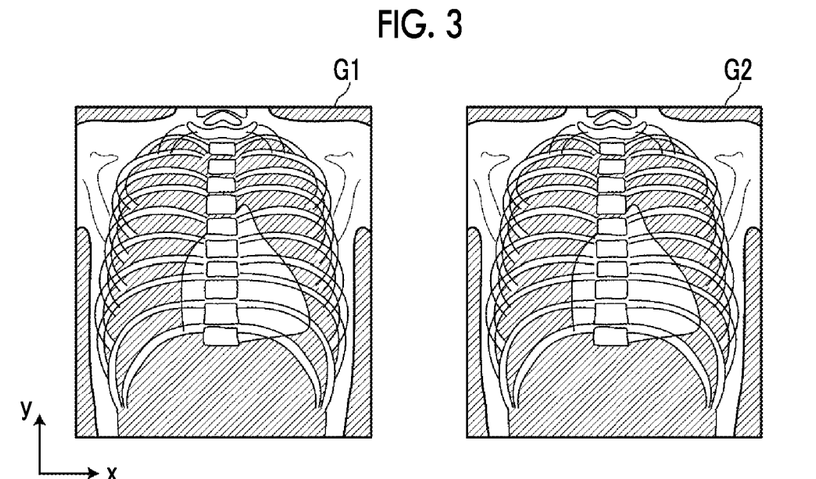
FIG. 3 is a diagram showing first and second radiation images.

The image acquisition unit 31 drives the X-ray source 3 to irradiate the subject H with X-rays, detects the X-rays that pass through the subject H using the first and second radiation detectors 5 and 6, and acquires the first and second radiation images G1 and G2. The first and second radiation images G1 and G2 may be acquired using a separate program other than the image processing program, and may be stored in the storage 23. In this case, the image acquisition unit 31 reads the first and second radiation images G1 and G2 stored in the storage 23 from the storage 23 for image processing of the first and second radiation images G1 and G2. In a case where the chest portion of the subject H is imaged, the first and second radiation images G1 and G2 shown in FIG. 3 are acquired.

Figure 4:
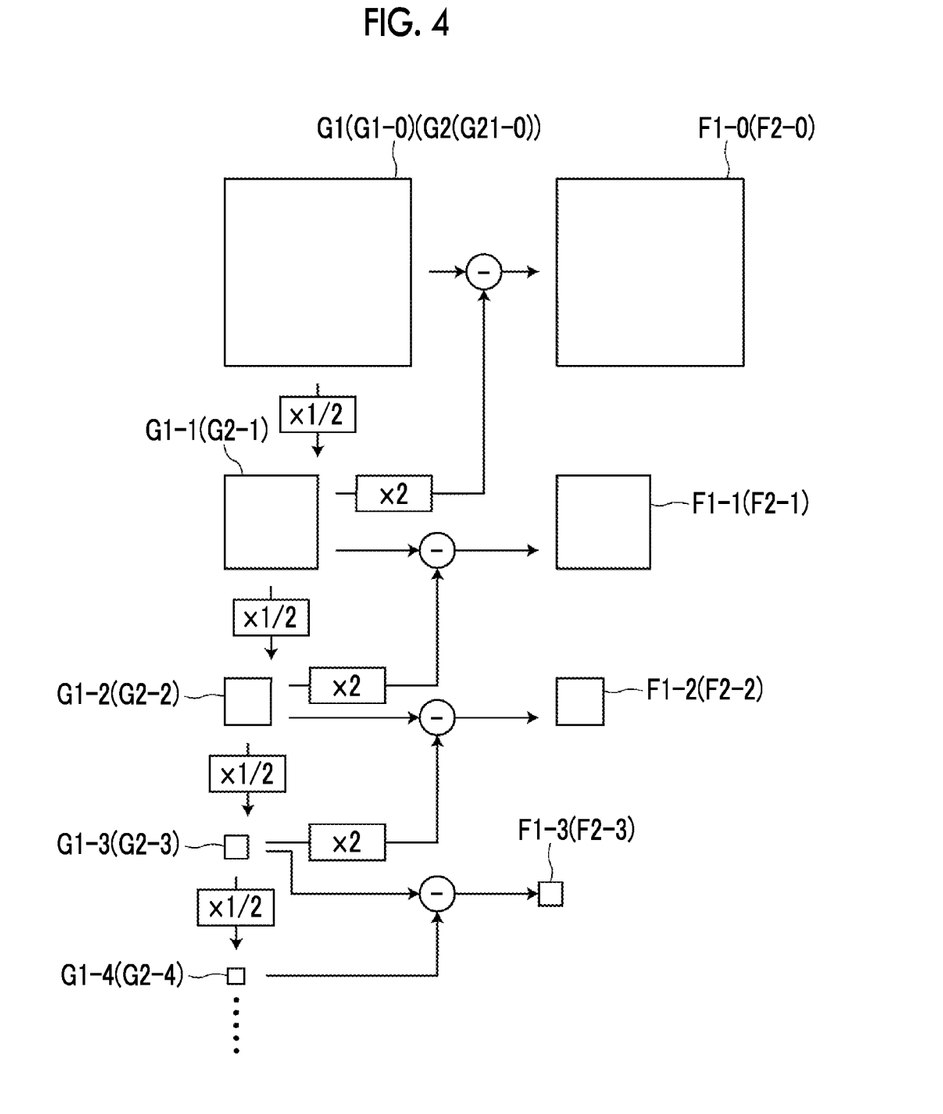
FIG. 4 is a diagram illustrating frequency resolution performed by a first frequency analysis unit.

The first frequency analysis unit 32 detects a first high-frequency component GH1 and a first low-frequency component GL1 which are a high-frequency component and a low-frequency component of the first radiation image G1. The first frequency analysis unit 32 resolves the frequency of the first radiation image G1 to generate a plurality of band images indicating a frequency component for each of a plurality of frequency bands with respect to the first radiation image G1. FIG. 4 is a diagram illustrating frequency resolution performed by the first frequency analysis unit 32. First, the first frequency analysis unit 32 performs a filtering process with respect to the first radiation image G1 using a Gaussian filter of $\sigma=1$, for example to reduce the size of the first radiation image G1 into ½ to thereby generate a reduced image G1-1 which is a Gaussian component. The reduced image G1-1 refers to an image obtained by reducing the size of the first radiation image G1 into ½. In the following description, the first radiation image G1 may be referred to as a first radiation image G1-0, for ease of description. Then, the first frequency analysis unit 32 performs an interpolation calculation such as cubic B-spline interpolation to magnify the reduced image G1-1 two times to have the same size as that of the first radiation image G1, and subtracts the reduced image G1-1 from the first radiation image G1 to generate a band image F1-0 which is a Laplacian component of the highest frequency band. In this embodiment, the highest frequency band is referred to as a 0-th frequency band, for ease of description.

Then, the first frequency analysis unit 32 performs a filtering process with respect to the reduced image G1-1 using the Gaussian filter of $\sigma=1$ to reduce the size of the reduced image G1-1 into ½ to thereby generate a reduced image G1-2, magnifies the reduced image G1-2 two times to have the same size as that of the reduced image G1-1, and subtracts the magnified reduced image G1-2 from the reduced image G1-1 to generate a band image F1-1 of a first frequency band. Further, by repeating the above processes until a band image of a desired frequency band is generated, band images F1-$k$ ($k=0$ to a in which a is the number of bands) of a plurality of frequency bands are generated. Thus, a reduced image G1–(a+1) of a minimum frequency is also generated.

Here, a signal value of each pixel of a reduced image represents the density of the pixel, and a signal value of each pixel of the band images F1-$k$ represents the size of a frequency component of a corresponding frequency band in the pixel. By using another multiple resolution conversion method such as wavelet conversion, a plurality of band images F1-$k$ with different frequency bands may be generated.

The first frequency analysis unit 32 generates each band image from the highest frequency band to a predetermined frequency band as the first high-frequency component GH1. In this embodiment, the first frequency analysis unit 32 generates the first high-frequency component GH1 of a frequency band according to an imaging portion of the subject H. For example, in a case where the chest portion is an imaging portion, a region of maximum interest corresponds to pulmonary blood vessels. Thus, in a case where the chest portion is the imaging portion, the first frequency analysis unit 32 generates each band image from the highest frequency band to a frequency band including information on pulmonary blood vessels as the first high-frequency component GH1. Further, in a case where the imaging portion is a lumbar spine or a hip joint shaft portion, since a bone portion such as a joint which is a structure larger than pulmonary blood vessels becomes a region of maximum interest, each band image from the highest frequency band to a frequency band lower than that of the pulmonary blood vessels is generated as the first high-frequency component GH1. A relationship between an imaging portion and a frequency band generated as the first high-frequency component GH1 is generated in advance and is stored in the storage 23. The first frequency analysis unit 32 determines a frequency band of a band image to be generated with reference to the relationship stored in the storage 23 on the basis of information on the imaging portion input from the input unit 9 to generate the first high-frequency component GH1.

On the other hand, the first frequency analysis unit 32 generates a reduced image used in a case where a band image of the lowest frequency band included in the first high-frequency component GH1 is generated as the first low-frequency component GL1. For example, in a case where a frequency image F1-2 of the second frequency band is generated as the first high-frequency component GH1, the first low-frequency component GL1 becomes a reduced image G1-3.

The first frequency analysis unit 32 may generate band images and reduced images of a plurality of frequency bands, and may select, as the first high-frequency component GH1, each band image up to a frequency band according to an imaging portion from the band images of the plurality of frequency bands. In this case, the first frequency analysis unit 32 may select a reduced image used in a case where a band image of the lowest frequency band included in the first high-frequency component GH1 as the first low-frequency component GL1.

The second frequency analysis unit 33 generates a second low-frequency component GL2 which is a low-frequency component of the second radiation image G2 acquired by the second radiation detector 6. Similar to the first frequency analysis unit 32, the second frequency analysis unit 33 generates each band image from the highest frequency band to a predetermined frequency band, determined according to an imaging portion, as the second high-frequency component GH2. The second high-frequency component GH2 becomes a band image up to the same frequency band as that of the first high-frequency component GH1. The second frequency analysis unit 33 generates a reduced image used in a case where a band image of the lowest frequency band included in the second high-frequency component GH2 is generated as the second low-frequency component GL2. The first low-frequency component GL1 and the second low-frequency component GL2 become reduced images of the same frequency band. For example, in a case where the first low-frequency component GL1 is the reduced image G1-3, the second low-frequency component GL2 becomes the reduced image G2-3.

The second frequency analysis unit 33 may generate band images and reduced images of a plurality of frequency bands, and may select a reduced image of a frequency band according to an imaging portion, that is, a reduced image of the same frequency band as that of the first low-frequency component GL1 as a second high-frequency component GH2.

The subtraction processing unit 34 performs weighting and subtraction between corresponding pixels with respect to the first low-frequency component GL1 and the second low-frequency component GL2 to generate a subtraction low-frequency component GLsub obtained by extracting a specific structure of the subject H included in each of the low-frequency components GL1 and GL2. For example, in a case where the first and second radiation images G1 and G2 are radiation images of the chest portion as shown in FIG. 3, the subtraction processing unit 34 appropriately performs weighting and subtraction with respect to the first low-frequency component GL1 and the second low-frequency component GL2 to generate a soft portion image of a low-frequency component obtained by extracting only a soft portion of the subject H and a bone portion image of a low-frequency component obtained by extracting only a bone portion thereof. A weighting coefficient in a case where the weighting and subtraction are performed may vary for each place of the subject H in consideration of beam hardening. In the following description, it is assumed that one subtraction low-frequency component GLsub is generated.

Figure 5:
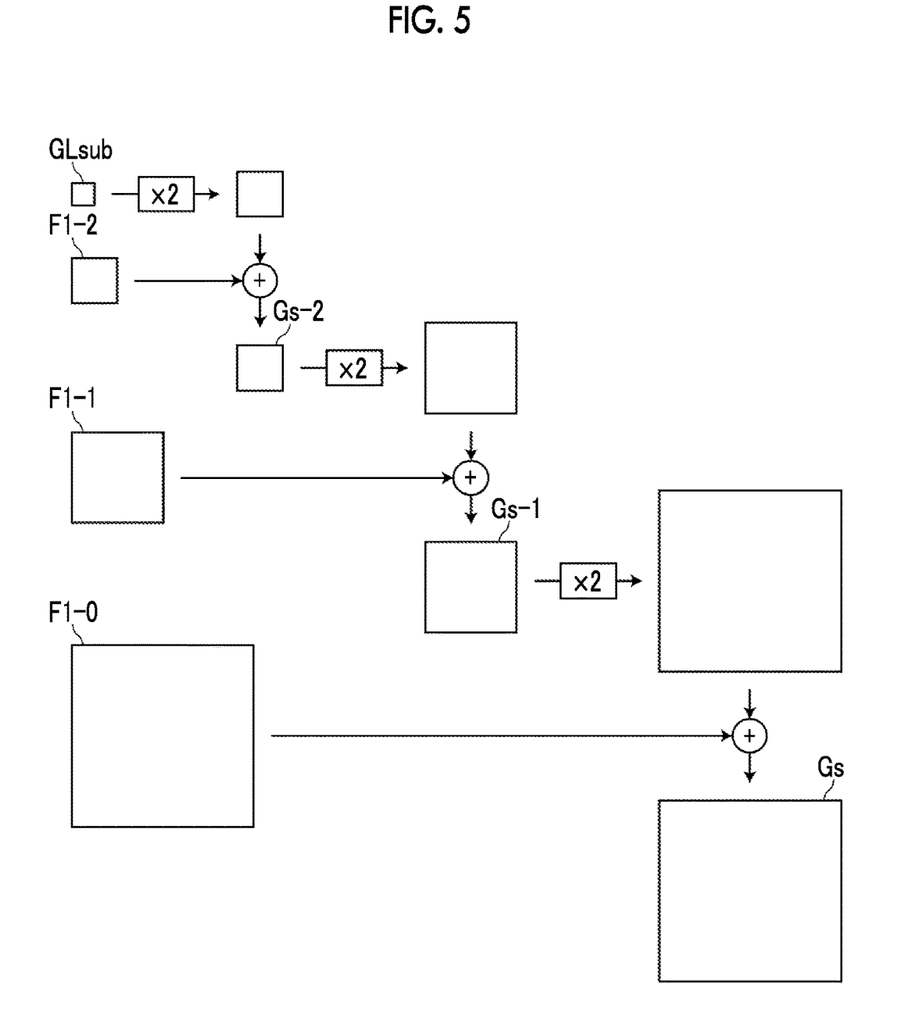
FIG. 5 is a diagram illustrating frequency synthesis performed by a synthesis unit in the first embodiment.

The synthesis unit 35 synthesizes the subtraction low-frequency component GLsub and the first high-frequency component GH1 to generate a processed image Gs obtained by extracting a specific structure of the subject H. FIG. 5 is a diagram illustrating the synthesis of the subtraction low-frequency component GLsub and the first high-frequency component GH1. In this embodiment, the synthesis means frequency synthesis. In this embodiment, band images F1-0, F1-1, and F1-2 up to the second frequency band are generated as the first high-frequency component GH1, and the reduced image G1-3 and the reduced image G2-3 are generated as the first low-frequency component GL1 and the second low-frequency component GL2, respectively. Thus, the frequency band of the subtraction low-frequency component GLsub becomes a third frequency band.

Figure 6:
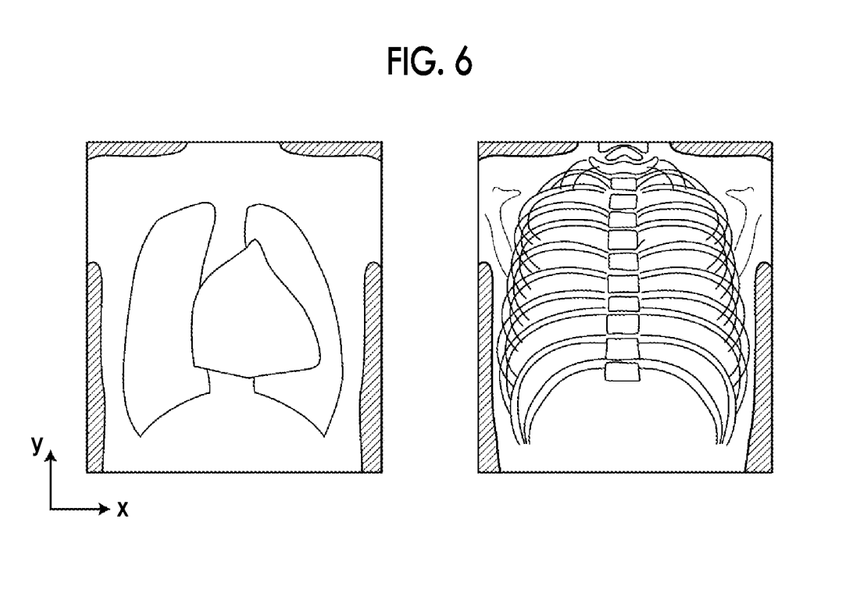
FIG. 6 is a diagram showing a soft portion image and a bone portion image.

The synthesis unit 35 magnifies the subtraction low-frequency component GLsub two times using interpolation calculation, and adds the subtraction low-frequency component GLsub which is magnified two times to the band image F1-2 of the second frequency band to generate a synthesis image Gs-2. Then, the synthesis unit 35 magnifies the synthesis image Gs-2 two times, and adds the synthesis image Gs-2 which is magnified two times to the band image F1-1 of the first frequency band to generate a synthesis image Gs-1. Further, the synthesis unit 35 magnifies the synthesis image Gs-1 two times, and adds the synthesis image Gs-1 which is magnified two times to the band image F1-0 of the 0-th frequency band to generate a synthesis image Gs-0, that is, a processed image Gs. Thus, in a case where a region of interest of the subject H is a soft portion, as shown on the left side of FIG. 6, a soft portion image obtained by extracting only the soft portion of the subject H is generated as the processed image Gs. Further, in a case where the region of interest of the subject H is a bone portion, as shown on the right side of FIG. 6, a bone portion image obtained by extracting only the bone portion of the subject H is generated as the processed image Gs.

Figure 7:
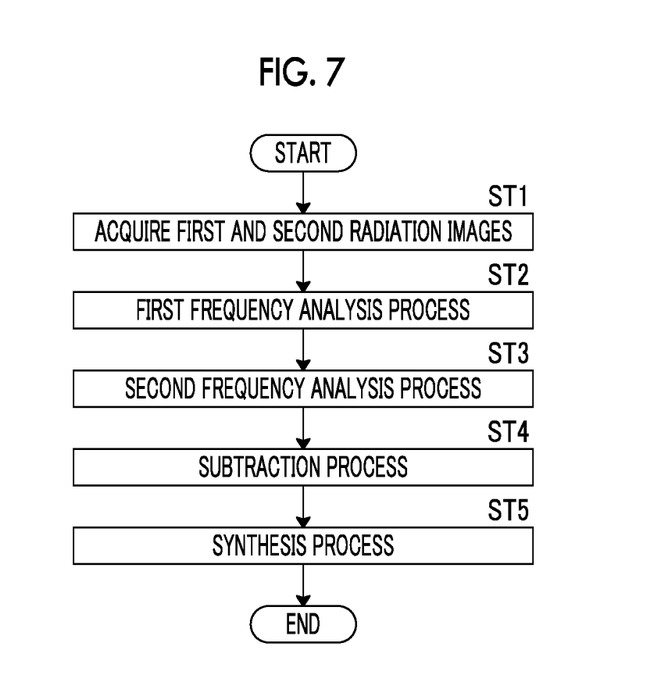
FIG. 7 is a flowchart showing processes performed in the first embodiment.

Then, processes performed in the first embodiment will be described. FIG. 7 is a flowchart showing processes performed in the first embodiment. First, the image acquisition unit 31 acquires the first and second radiation images G1 and G2 from the first and second radiation detectors 5 and 6 (step ST1). Then, the first frequency analysis unit 32 performs a first frequency analysis process of generating the first high-frequency component GH1 and the first low-frequency component GL1 which are a high-frequency component and a low-frequency component of the first radiation image G1 (step ST2), and the second frequency analysis unit 33 performs a second frequency analysis process of generating the second low-frequency component GL2 which is a low-frequency component of the second radiation image G2 (step ST3).

Further, the subtraction processing unit 34 performs weighting and subtraction between corresponding pixels with respect to the first low-frequency component GL1 and the second low-frequency component GL2 to generate a subtraction low-frequency component GLsub obtained by extracting a specific structure of the subject H in each of the low-frequency components GL1 and GL2 (step ST4). Then, the synthesis unit 35 performs a synthesis process of synthesizing the subtraction low-frequency component GLsub and the first high-frequency component GH1 to generate the processed image Gs (step ST5), and then, the processes are terminated.

Here, since the first radiation image G1 is acquired by X-rays with a large amount of radiation, noise is small. Thus, the first high-frequency component GH1 which is a high-frequency component of the first radiation image G1 has noise which is not noticeable, and includes information on a fine structure of the subject H. Further, the first low-frequency component GL1 which is a low-frequency component of the first radiation image G1 includes information on a general structure of the subject H. On the other hand, since the second radiation image G2 is acquired by X-rays with a small amount of radiation, granulation is poor, and thus, a large amount of noise is included therein. However, since noise represents information on a high-frequency component, the second low-frequency component GL2 which is a low-frequency component of the second radiation image G2 includes information on a general structure of the subject that does not include noise. Thus, each item of information on general structures of the subject H with different energy distributions is included in the first low-frequency component GL1 and the second low-frequency component GL2. Accordingly, the subtraction low-frequency component GLsub indicates a subtraction image with respect to a general structure of a specific structure of the subject H that does not include noise. Further, by synthesizing the subtraction low-frequency component GLsub and the first high-frequency component GH1, even in a thick portion, it is possible to generate a processed image Gs obtained by extracting a specific structure of the subject H, having a fine structure of the subject H and reduced noise. Further, even in a case where the amount of radiation is low in a case where the second radiation image G2 is acquired using a two-shot method, it is possible to reduce noise of a processed image, and thus, it is possible to reduce an exposure dose of the subject H.

Since the first high-frequency component GH1 of a frequency band according to an imaging portion, the first low-frequency component GL1, and the second low-frequency component GL2 are generated to generate the processed image Gs, it is possible to generate the processed image Gs in order to include a frequency component of a structure which becomes a region of maximum interest. Accordingly, it is possible to generate the processed image Gs suitable for medical diagnosis of a structure of a medical diagnosis target.

In the processed image Gs generated according to this embodiment, for example, a soft portion image includes a high-frequency component of a bone portion in addition to a high-frequency component of a soft portion. Further, a bone portion image also includes a high-frequency component of the soft portion. Such a high-frequency component does not interrupt medical diagnosis, but may be removed from the processed image Gs. For example, by using a method for repeating a smoothening process and a subtraction process disclosed in JP1991-285475A (JP-H03-285475A) or JP1999-205682A (JP-H11-205682A), it is possible to remove the high-frequency component of the bone portion in the soft portion image or the high-frequency component of the soft portion in the bone portion image. For example, in a case where the high-frequency component of the soft portion is removed, in the process of repeating the smoothening process and the subtraction process, by gradually reducing filter noise for smoothening, it is possible to effectively remove the high-frequency component of the soft portion without shading-off of the bone portion.

Next, a second embodiment of the invention will be described. Since a configuration of an image processing apparatus according to the second embodiment of the invention is the same as the configuration of the image processing apparatus in the first embodiment and only processes to be performed are different, detailed description about the apparatus will not be repeated The second embodiment is different from the first embodiment in that the synthesis unit 35 performs weighting and synthesis with respect to the subtraction low-frequency component GLsub and the first high-frequency component GH1 according to the body thickness of the subject H to generate the processed image Gs.

Here, in the subject H, since the amount of X-ray absorption is larger at a place where the body thickness is larger, the S/N ratio decreases in the first and second radiation images G1 and G2. Contrarily, since the amount of X-ray absorption is smaller at a place where the body thickness is smaller, the S/N ratio is enhanced in the second radiation image G2. Thus, in the second embodiment, the subtraction low-frequency component GLsub and the first high-frequency component GH1 are weighted and synthesized while changing weighting coefficients according to the body thickness of the subject H to generate the processed image Gs. Here, X-rays that pass through the subject H are smaller as the thickness is larger. In the second embodiment, the synthesis unit 35 estimates the thickness of the subject H1 on the basis of the amount of radiation in imaging and a pixel value in each pixel of the first radiation image G1. Further, by setting a weighting coefficient of the first high-frequency component GH1 to be larger with respect to a pixel at a place where the thickness is larger, the subtraction low-frequency component GLsub and the first high-frequency component GH1 are synthesized.

Figure 8:
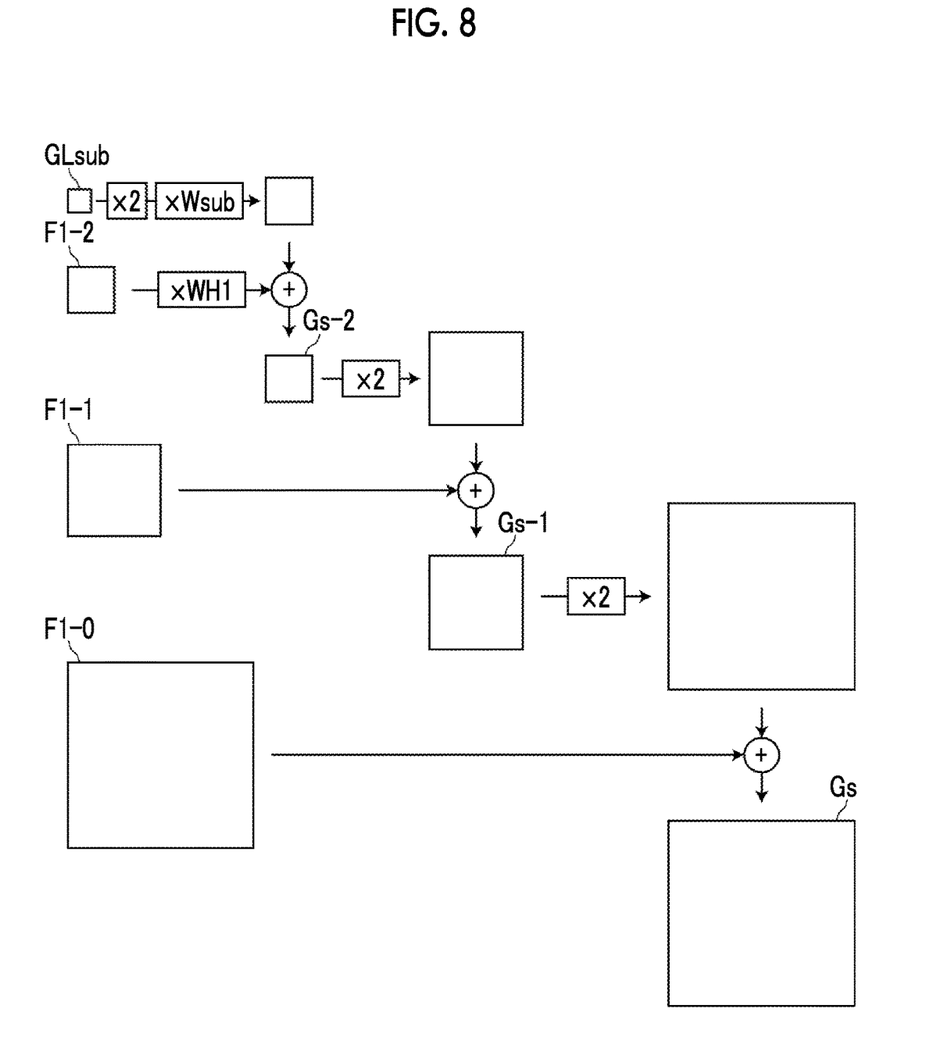
FIG. 8 is a diagram illustrating frequency synthesis performed by a synthesis unit in a second embodiment.

FIG. 8 is a diagram illustrating weighting and synthesis of the subtraction low-frequency component GLsub and the first high-frequency component GH1 in the second embodiment. Here, a weighting coefficient for the subtraction low-frequency component GLsub is represented Wsub, and a weighting coefficient for the first high-frequency component GH1 is represented WH1, and it is assumed that Wsub+WH1=1. In the second embodiment, the synthesis unit 35 magnifies the subtraction low-frequency component GLsub two times using interpolation calculation, and multiplies the magnified subtraction low-frequency component GLsub by the weighting coefficient Wsub. Further, the synthesis unit 35 adds the subtraction low-frequency component GLsub which is magnified two times and is multiplied by the weighting coefficient Wsub to the band image F1-2 of the second frequency band which is multiplied by the weighting coefficient WH1 to generate a synthesis image Gs-2. Then, the synthesis unit 35 magnifies the synthesis image Gs-2 two times, and adds the synthesis image Gs-2 which is magnified two times to the band image F1-1 of the first frequency band to generate a synthesis image Gs-1. Further, the synthesis unit 35 magnifies the synthesis image Gs-1 two times, and adds the synthesis image Gs-1 which is magnified two times to the band image F1-0 of the 0-th frequency band to generate a synthesis image Gs-0, that is, a processed image Gs. Thus, it is possible to generate the processed image Gs in which noise is reduced. The frequency band to be multiplied by the weighting coefficient WH1 is not limited to the second frequency band, and may be the first frequency band or the 0-th frequency band.

Next, a third embodiment of the invention will be described. Since a configuration of an image processing apparatus according to the third embodiment of the invention is the same as the configuration of the image processing apparatus in the first embodiment and only processes to be performed are different, detailed description about the apparatus will not be repeated. The third embodiment is different from the first embodiment in that the synthesis unit 35 performs weighting and synthesis with respect to the subtraction low-frequency component GLsub and the first high-frequency component GH1 according to the density of the subject H in the first radiation image G1 or the second radiation image G2 while changing a weighting coefficient for each place, to generate the processed image Gs.

Here, in the radiation image, the fact that the density is low means that absorption of X-rays in a corresponding portion of the subject H is large. Thus, in the radiation image, as the density is lower, noise is larger, and the S/N ratio is smaller. Contrarily, as the density is high, noise is not noticeable. Similarly, in the second radiation image G2, noise is not noticeable. Accordingly, in the third embodiment, the subtraction low-frequency component GLsub and the first high-frequency component GH1 are weighted and synthesized while changing weighting coefficients according to places to generate the processed image Gs. Specifically, the subtraction low-frequency component GLsub and the first high-frequency component GH1 are synthesized by setting a weighting coefficient of the first high-frequency component GH1 to be larger with respect to a pixel with a lower density. The density of the subject H may be calculated from either of the first radiation image G1 or the second radiation image G2, but it is preferable that the density of the subject H is calculated from the first radiation image G1.

A synthesis process of the subtraction low-frequency component GLsub and the first high-frequency component GH1 according to the density of the subject H is the same as that in the second embodiment except that a weighting coefficient varies according to the density of the subject H. Here, in the third embodiment, a weighting coefficient for the subtraction low-frequency component GLsub is represented Wdsub, and a weighting coefficient for the first high-frequency component GH1 is represented WHd1, and it is assumed that Wdsub+WHd1=1. That is, in the third embodiment, the synthesis unit 35 magnifies the subtraction low-frequency component GLsub two times using interpolation calculation, and multiplies the magnified subtraction low-frequency component GLsub by the weighting coefficient Wdsub. Further, the synthesis unit 35 adds the subtraction low-frequency component GLsub which is magnified two times and is multiplied by the weighting coefficient Wdsub to the band image F1-2 of the second frequency band multiplied by the weighting coefficient WHd1 to generate a synthesis image Gs-2. Then, the synthesis unit 35 magnifies the synthesis image Gs-2 two times, and adds the synthesis image Gs-2 which is magnified two times to the band image F1-1 of the first frequency band to generate a synthesis image Gs-1. Further, the synthesis unit 35 magnifies the synthesis image Gs-1 two times, and adds the synthesis image Gs-1 which is magnified two times to the band image F1-0 of the 0-th frequency band to generate a synthesis image Gs-0, that is, a processed image Gs. Thus, it is possible to generate the processed image Gs in which noise is reduced. The frequency band to be multiplied by the weighting coefficient WHd1 is not limited to the second frequency band, and may be the first frequency band or the 0-th frequency band.

Further, in the respective embodiments, image processing is performed using radiation images acquired in a system that captures radiation images of a subject using the first and second radiation detectors 5 and 6, but even in a case where the first and second radiation images G1 and G2 are acquired using a storage phosphor sheet as detection unit, the invention may be applied thereto. In this case, X-rays that pass through the subject H may be emitted to two storage phosphor sheets in an overlapping manner, information on a radiation image of the subject H may be stored and recorded on each storage phosphor sheet, the information on the radiation image may be photoelectrically read from each storage phosphor sheet, and thus, the first and second radiation images G1 and G2 may be acquired.

In addition, in the respective embodiments, the first high-frequency component GH1, the first low-frequency component GL1, and the second low-frequency component GL2 are generated through frequency resolution, but the first high-frequency component GH1, the first low-frequency component GL1, and the second low-frequency component GL2 may be generated using a filtering process of a high pass filter, or the like. In a case where the first high-frequency component GH1, the first low-frequency component GL1, and the second low-frequency component GL2 are generated using such a filtering process, the synthesis unit 35 may add the first high-frequency component GH1 to the subtraction low-frequency component GLsub to generate the processed image Gs.

In the respective embodiments, the first and second radiation images G1 and G2 are acquired using a one-shot method, but the first and second radiation images G1 and G2 may be acquired using a so-called two-shot method in which imaging is performed two times. In a case where the two-shot method is performed, in order to reduce an exposure dose to the subject H, the amount of radiation emitted to the subject H in the first imaging is reduced compared with the second imaging. Thus, the second radiation image G2 acquired by the second imaging has a large amount of noise due to shortage of the amount of radiation, similar to the second radiation image G2 acquired by the one-shot method. Accordingly, by performing the processes with respect to the first and second radiation images G1 and G2 acquired by the two-shot method in a similar way to the above-described embodiments, it is possible to generate a processed image Gs obtained by extracting a specific structure of the subject H having a fine structure of the subject H and reduced noise.

Hereinafter, effects of the embodiments will be described.

Since the amount of radiation absorption is larger at a place where a body thickness of the subject is larger, noise becomes larger, and the S/N ratio becomes lower in radiation images. Contrarily, as the body thickness is smaller, noise becomes smaller. Thus, in the second radiation image, similarly, noise is not noticeable. Accordingly, the subtraction low-frequency component and the first high-frequency component are weighted and synthesized according to a body thickness of a subject to generate a processed image. Thus, it is possible to perform weighting and synthesis in order to set the proportion of the first high-frequency component to become larger as the body thickness is larger, and thus it is possible to generate a processed image in which noise is further reduced.

In a radiation image, as the density is lower, the amount of absorption of radiation at a corresponding portion is larger. Thus, noise is larger, and the S/N ratio is smaller. Contrarily, as the density is higher, noise is less noticeable. Thus, in the second radiation image, similarly, noise is not noticeable. Accordingly, the subtraction low-frequency component and the first high-frequency component are weighted and synthesized according to the density of a subject to generate a processed image. Thus, it is possible to perform weighting and synthesis in order to set the proportion of the first high-frequency component to become larger as the density is lower, and thus it is possible to generate a processed image in which noise is further reduced.

For example, in imaging of a lumbar spine, in imaging of a hip joint shaft portion, or in imaging of a cervical spine side surface including the shoulder, a region of maximum interest is a bone portion, and a processed image obtained by removing a soft portion and extracting the bone portion is generated. Here, the soft portion of the waist, the hip joint, and the shoulder do not nearly include high-frequency components such as blood vessels. On the other hand, in a case where a processed image obtained by extracting a soft portion in imaging of the chest portion is generated, a region of maximum interest becomes pulmonary blood vessels, or the like. The pulmonary blood vessels or the like include information of a frequency component higher than that of the bone portion. Thus, by generating a first high-frequency component, a first low-frequency component and a second low-frequency component of a frequency band according to an imaging portion to generate a processed image, it is possible to generate a processed image that includes a frequency component of a structure which is a region of maximum interest. Accordingly, it is possible to generate a processed image suitable for medical diagnosis of a structure of a medical diagnosis target.

What is claimed is:
1. An image processing apparatus comprising:
a storage device, storing information on corresponding relationships between different imaging portions of a subject and a plurality of frequency bands, wherein each corresponding relationship includes a predetermined range of frequency bands for extracting a specific structure in an imaging portion of the subject; and
a processor configured to,
acquire two radiation images obtained by radiation rays passed through an imaging portion of the subject, having different energy distributions and different amounts of radiation, generate a first high-frequency component and a first low-frequency component which are a high-frequency component and a low-frequency component of a first radiation image acquired by radiation having a large amount of radiation among the two radiation images, generate a second low-frequency component which is a low-frequency component of a second radiation image acquired by radiation having a small amount of radiation among the two radiation images, perform weighting and subtraction between corresponding pixels with respect to the first low-frequency component and the second low-frequency component to generate a subtraction low-frequency component obtained by extracting a specific structure of the subject, and synthesize the subtraction low-frequency component and the first high-frequency component to generate a processed image, wherein the first high-frequency component and the first low-frequency component are generated to have different frequency bands according to one of the corresponding relationships stored in the storage device, wherein the first high-frequency component has a highest frequency band in a predetermined range of frequency bands for extracting the specific structure in the imaging portion of the subject, and the first low-frequency component has a lowest frequency band in the predetermined range of frequency bands, and wherein the second low-frequency component is generated to have the same frequency band as the first low-frequency component.

2. The image processing apparatus according to claim 1, wherein the processor performs weighting and synthesis with respect to the subtraction low-frequency component and the first high-frequency component according to a body thickness of the subject to generate the processed image.

3. The image processing apparatus according to claim 1, wherein the processor performs weighting and synthesis with respect to the subtraction low-frequency component and the first high-frequency component according to a density of the first radiation image or the second radiation image to generate the processed image.

4. An image processing method comprising:

acquiring two radiation images obtained by radiation rays passed through an imaging portion of a subject, having different energy distributions and different amounts of radiation;

generating a first high-frequency component and a first low-frequency component which are a high-frequency component and a low-frequency component of a first radiation image acquired by radiation having a large amount of radiation among the two radiation images;

generating a second low-frequency component which is a low-frequency component of a second radiation image acquired by radiation having a small amount of radiation among the two radiation images;

performing weighting and subtraction between corresponding pixels with respect to the first low-frequency component and the second low-frequency component to generate a subtraction low-frequency component obtained by extracting a specific structure of the subject; and synthesizing the subtraction low-frequency component and the first high-frequency component to generate a processed image, wherein the first high-frequency component and the first low-frequency component are generated according to a corresponding relationship between the imaging portion of the subject and a plurality of frequency bands, wherein the corresponding relationship includes a predetermined range of frequency bands for extracting the specific structure in the imaging portion of the subject, the first high-frequency component has a highest frequency band in the predetermined range of frequency bands, and the first low-frequency component has a lowest frequency band in the predetermined range of frequency bands, and wherein the second low-frequency component is generated to have the same frequency band as the first low-frequency component.

5. A non-transitory computer-readable recording medium having stored therein an image processing program that causes a computer to execute:

a process of acquiring two radiation images obtained by radiation rays passed through an imaging portion of a subject, having different energy distributions and different amounts of radiation;

a process of generating a first high-frequency component and a first low-frequency component which are a high-frequency component and a low-frequency component of a first radiation image acquired by radiation having a large amount of radiation among the two radiation images;

a process of generating a second low-frequency component which is a low-frequency component of a second radiation image acquired by radiation having a small amount of radiation among the two radiation images;

a process of performing weighting and subtraction between corresponding pixels with respect to the first low-frequency component and the second low-frequency component to generate a subtraction low-frequency component obtained by extracting a specific structure of the subject; and a process of synthesizing the subtraction low-frequency component and the first high-frequency component to generate a processed image, wherein the first high-frequency component and the first low-frequency component are generated according to a corresponding relationship between the imaging portion of the subject and a plurality of frequency bands, wherein the corresponding relationship includes a predetermined range of frequency bands for extracting the specific structure in the imaging portion of the subject, the first high-frequency component has a highest frequency band in the predetermined range of frequency bands, and the first low-frequency component has a lowest frequency band in the predetermined range of frequency bands, and wherein the second low-frequency component is generated to have the same frequency band as the first low-frequency component.

* * * * *